US010690313B2

(12) United States Patent
Buzzurro et al.

(10) Patent No.: US 10,690,313 B2
(45) Date of Patent: Jun. 23, 2020

(54) AUTOMOTIVE LIGHTING UNIT

(71) Applicant: Automotive Lighting Italia S.p.A., Venaria Reale (IT)

(72) Inventors: Alessandro Buzzurro, Tolmezzo (IT); Patrick Bianco, Tolmezzo (IT)

(73) Assignee: Automotive Lighting Italia S.p.A., Venaria Reale (IT)

( * ) Notice: Subject to any disclaimer, the term of this patent is extended or adjusted under 35 U.S.C. 154(b) by 0 days.

(21) Appl. No.: 16/205,544

(22) Filed: Nov. 30, 2018

(65) Prior Publication Data

US 2019/0170318 A1 Jun. 6, 2019

(30) Foreign Application Priority Data

Dec. 1, 2017 (IT) .......................... 102017000138867

(51) Int. Cl.
*F21S 43/247* (2018.01)
*B60Q 1/26* (2006.01)
(Continued)

(52) U.S. Cl.
CPC .......... *F21S 43/247* (2018.01); *B60Q 1/2607* (2013.01); *F21S 43/13* (2018.01);
(Continued)

(58) Field of Classification Search
CPC ........ F21S 43/247; F21S 43/237; F21S 43/50; F21S 43/40; F21S 43/245; B60Q 1/2607; G02B 6/0006
See application file for complete search history.

(56) References Cited

U.S. PATENT DOCUMENTS

2001/0040807 A1    11/2001  Luce
2006/0120099 A1*    6/2006  Dewald .............. G02B 27/0994
                                                    362/552
(Continued)

FOREIGN PATENT DOCUMENTS

DE           19737653        3/1999
DE       102005023817 A1    11/2006
(Continued)

OTHER PUBLICATIONS

Italian Search Report and Written Opinion for IT 102017000138867 dated Jun. 8, 2018.

*Primary Examiner* — Jong-Suk (James) Lee
*Assistant Examiner* — Christopher E Dunay
(74) *Attorney, Agent, or Firm* — McCarter & English, LLP

(57) ABSTRACT

An automotive lighting unit wherein the lighting assembly that backlights the front half-shell comprises: at least one light-guide body made of photoconductive material, which is placed inside the rear body and is structured to channel, by total internal reflection and towards said transparent or semi-transparent portion of the front half-shell, the light that enters into the light-guide body through a light-incoupling end or sidewall of the same light-guide body; an active light deflector device which is placed inside the rear body, facing the light-incoupling end or sidewall of said light-guide body; and an electrically-powered light source which is placed inside the rear body and emits, on command, a collimated light beam towards the active light deflector device; the active light deflector device being adapted to reflect/divert said collimated light beam towards the light-incoupling end or sidewall of said light-guide body, so that the collimated light beam can enter into the light-guide body and then travel inside the light-guide body by total internal reflection.

13 Claims, 4 Drawing Sheets

(51) Int. Cl.
*F21S 43/31* (2018.01)
*F21S 43/50* (2018.01)
*F21S 43/14* (2018.01)
*F21S 43/237* (2018.01)
*F21S 43/13* (2018.01)
*F21S 43/40* (2018.01)
*F21S 43/30* (2018.01)
*F21S 43/239* (2018.01)
*F21S 43/245* (2018.01)
*F21V 8/00* (2006.01)
*G02B 26/08* (2006.01)

(52) U.S. Cl.
CPC .............. *F21S 43/14* (2018.01); *F21S 43/237* (2018.01); *F21S 43/239* (2018.01); *F21S 43/245* (2018.01); *F21S 43/30* (2018.01); *F21S 43/31* (2018.01); *F21S 43/40* (2018.01); *F21S 43/50* (2018.01); *G02B 6/001* (2013.01); *G02B 6/003* (2013.01); *G02B 6/0006* (2013.01); *G02B 6/0031* (2013.01); *G02B 26/0833* (2013.01)

(56) References Cited

U.S. PATENT DOCUMENTS

| | | | |
|---|---|---|---|
| 2016/0347237 A1* | 12/2016 | Bhakta | F21S 41/285 |
| 2017/0175969 A1* | 6/2017 | Gut | B60Q 1/08 |
| 2017/0261173 A1* | 9/2017 | Suzuki | B60Q 1/08 |
| 2017/0321857 A1* | 11/2017 | Reisinger | F21S 41/365 |
| 2017/0350570 A1* | 12/2017 | Schwaiger | F21S 41/14 |
| 2018/0154819 A1* | 6/2018 | Hoshino | B60Q 1/085 |
| 2018/0313510 A1* | 11/2018 | Albou | F21S 41/675 |

FOREIGN PATENT DOCUMENTS

| | | |
|---|---|---|
| WO | 2013/008215 A1 | 1/2013 |
| WO | 2013/099144 A1 | 7/2013 |
| WO | 2015/107273 A1 | 7/2015 |

* cited by examiner

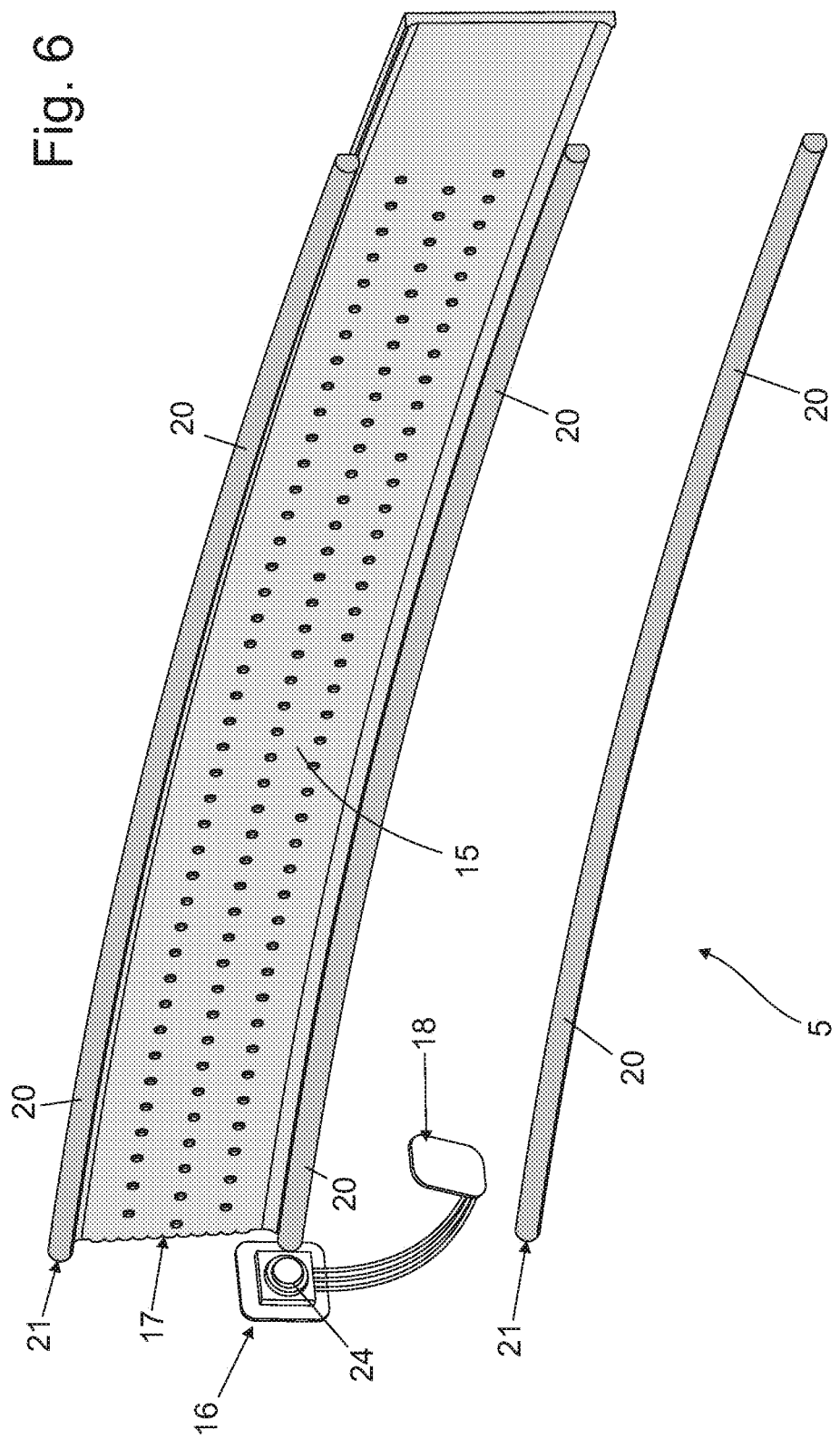

AUTOMOTIVE LIGHTING UNIT

CROSS-REFERENCE TO RELATED APPLICATIONS

This patent application claims priority from Italian Patent Application No. 102017000138867 filed on Dec. 1, 2017, the disclosure of which is incorporated by reference.

TECHNICAL FIELD

The invention relates to an automotive lighting unit.

More in detail, the invention preferably relates to a taillight for cars and similar vehicles, i.e., a lighting device adapted to be incorporated into a motor vehicle with the function of signalling the position, the sudden deceleration and/or the turning direction of the vehicle, and/or with the function of lighting the area surrounding the vehicle. Use to which the description below will make explicit reference without however loosing in generality.

BACKGROUND OF THE INVENTION

As it is known, automotive taillights and the like usually comprise: a substantially basin-shaped and rigid rear body, which is structured to be stably fitted into a compartment especially formed in the rear part of the bodywork of the vehicle; a front half-shell that closes the mouth of the rear body so as to surface from the bodywork of the vehicle, and is usually provided with a plurality of transparent or semi-transparent portions, usually with different colour to one another; and a series of lighting assemblies that are located inside the rear body, each immediately underneath a respective transparent or semi-transparent portion of the front half-shell, so as to backlight the superjacent transparent or semi-transparent portion of the front half-shell.

Over the last few years, some car manufacturers have chosen to equip their newest car models with taillights in which the front half-shell is provided with one or more large-sized transparent or semi-transparent portions.

The lighting assemblies designed to backlight the large-sized transparent or semi-transparent portions generally comprise: a light-guide plate which is made of a photoconductive material and extends inside the rear body with the front face skimming over the transparent or semi-transparent portion to be backlighted, substantially over the entire extension of the same transparent or semi-transparent portion; and a series of LEDs (acronym for Light Emitting Diode), which are adjacent to and immediately face at least a lateral sidewall of the light-guide plate, so as to direct the light produced directly into the body of the light-guide plate. Said light than travels inside the body of the light-guide plate through total internal reflection and comes out of the front face of the light-guide plate directed towards the front half-shell, so that it can backlight the superjacent transparent or semi-transparent portion of the half-shell.

Unfortunately, in order to backlight the corresponding transparent or semi-transparent portion of the half-shell in a sufficiently uniform manner, the lighting assemblies described above need a large number of LEDs properly spaced apart from one another along the entire length of the lateral sidewall of the light-guide device, with all the problems that this entails. These problems are furthermore intensified if the LEDs have to be placed along two or more lateral sidewalls of the light-guide plate.

Said LEDs, in fact, are relatively expensive components and their cost significantly affects the total manufacturing costs of an automotive lighting unit.

In addition, an electronic board housing the LEDs necessarily must be accommodated in the rear body together with the power supply and control circuits, thus taking up a large space and preventing to reduce the dimensions of the taillight beyond a given limit.

Finally, during operation, the LEDs produce a significant quantity of heat that necessarily must be dissipated outwards, for example through large radiant surfaces made of copper and placed on the electronic board at the expense of the total dimensions of the board itself.

SUMMARY OF THE INVENTION

Aim of the present invention is to provide a lighting assembly capable of overcoming the drawbacks referred above.

In compliance with these aims, according to the present invention there is provided an automotive lighting unit as defined in claim 1 and preferably, though not necessarily, according to any one of the claims depending on it.

BRIEF DESCRIPTION OF THE DRAWINGS

The invention will now be described with reference to the accompanying drawings, which show a non-limiting embodiment thereof, wherein:

FIG. 5 is a perspective view of a first lighting assembly of the automotive lighting unit shown in FIGS. 1, 2 and 3, with parts removed for greater clarity; whereas FIG. 6 is a perspective view of a second lighting assembly of the automotive lighting unit shown in FIGS. 1, 2, 3 and 4, with parts removed for greater clarity.

DETAILED DESCRIPTION OF THE INVENTION

Figure 1:
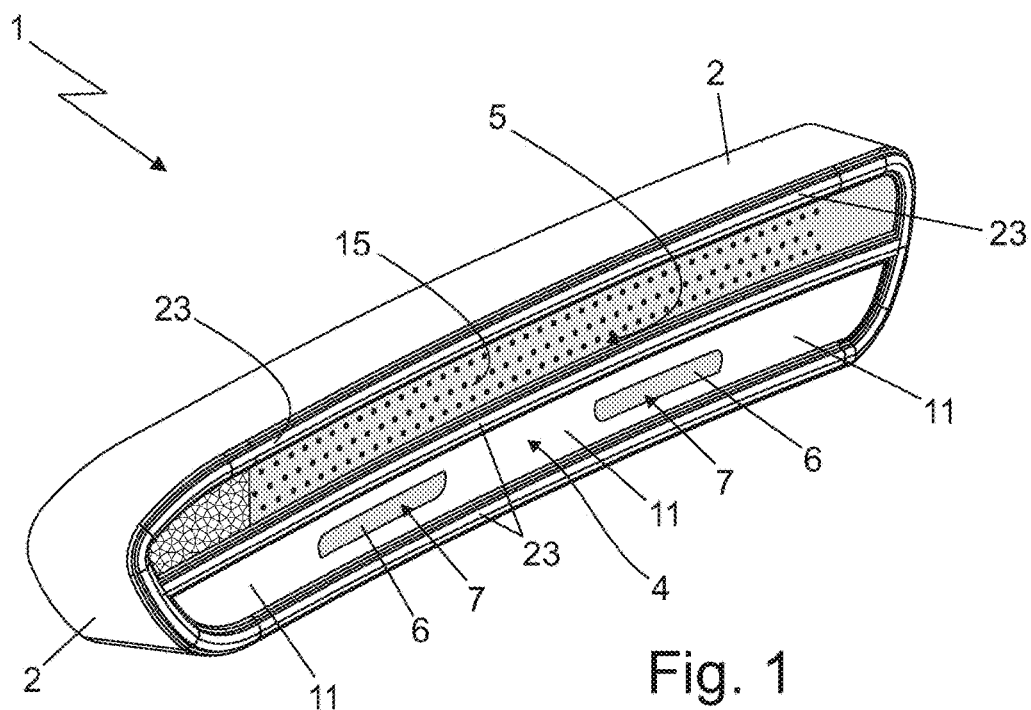
FIG. 1 is a front perspective view of an automotive lighting unit realized according to the teachings of the present invention, with parts removed for greater clarity.
Figure 2:
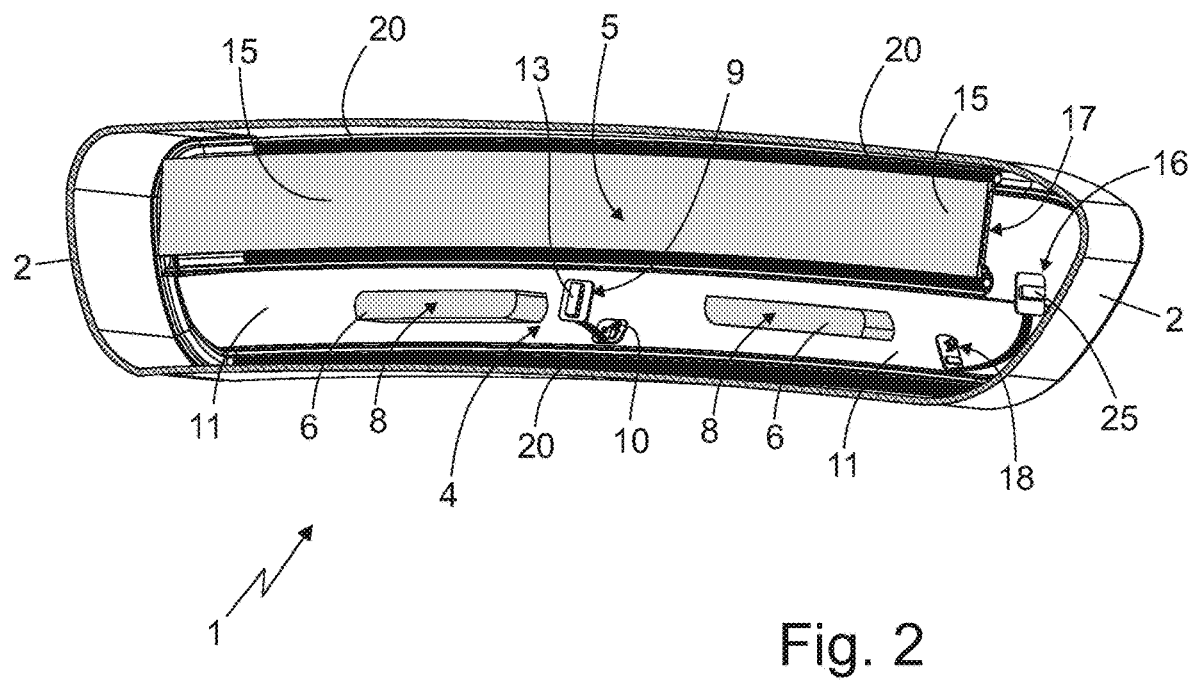
FIG. 2 is a rear perspective view of the automotive lighting unit shown in FIG. 1, with parts in section and parts removed for greater clarity.

With reference to FIGS. 1 and 2, number 1 denotes, as a whole, an automotive lighting unit, i.e. a lighting device especially adapted to be placed in the front or rear part of the bodywork of a motor vehicle, preferably with the function of lighting the area surrounding the vehicle and/or with the function of signalling the position of the vehicle and/or the sudden deceleration of the vehicle and/or the turning direction of the vehicle while driving.

In other words, the automotive lighting unit 1 is adapted to be fixed on the front or rear part of the bodywork of a car, van, truck, motorcycle or other similar motor vehicle, in order to fulfil the function of headlight or taillight.

In the example shown, in particular, the automotive lighting unit 1 is preferably structured to be stably fitted into the rear part of the bodywork of a car or other similar motor vehicle.

Figure 3:
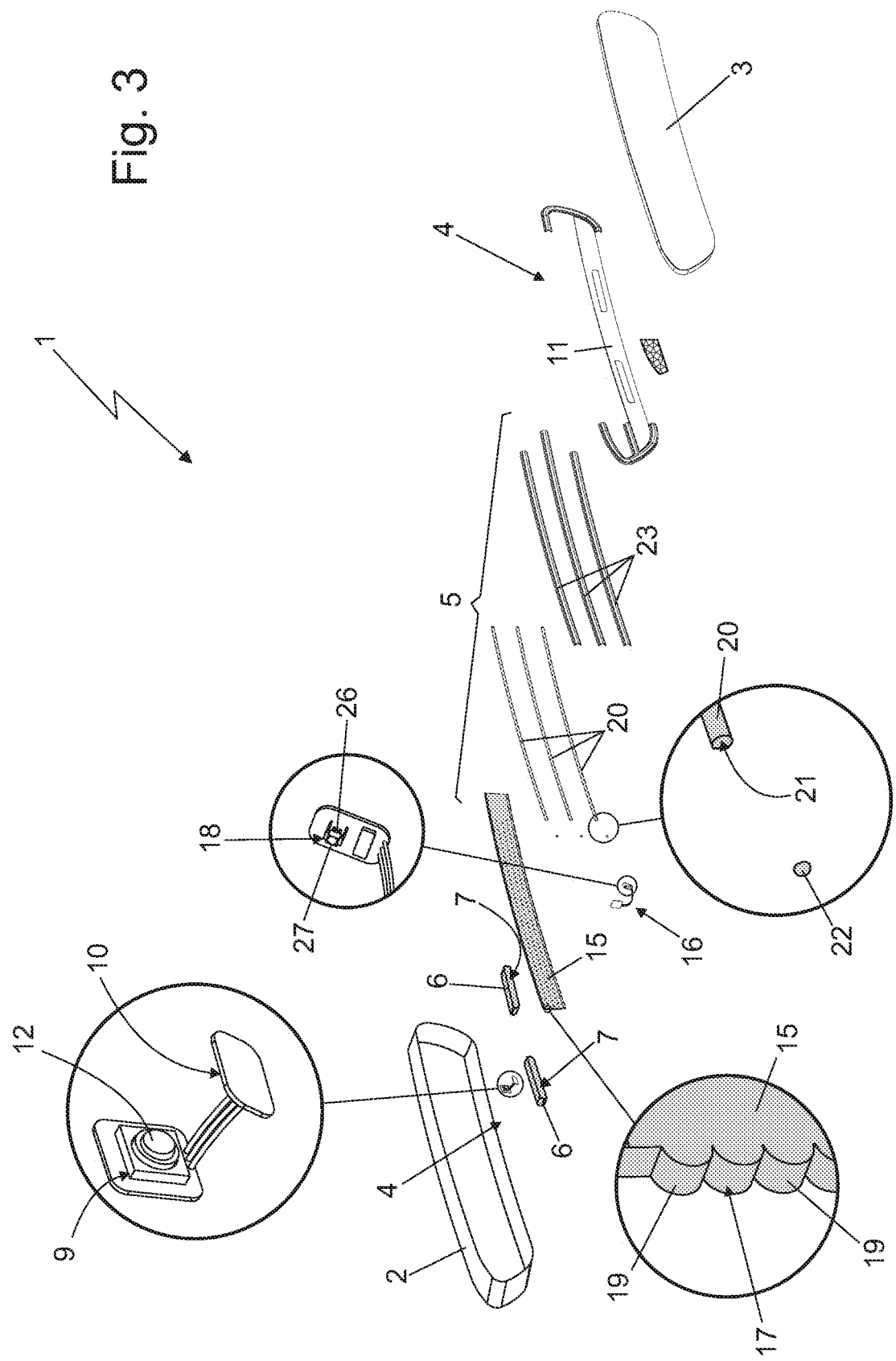
FIG. 3 is an exploded perspective view of the automotive lighting unit shown in FIGS. 1 and 2.
Figure 4:
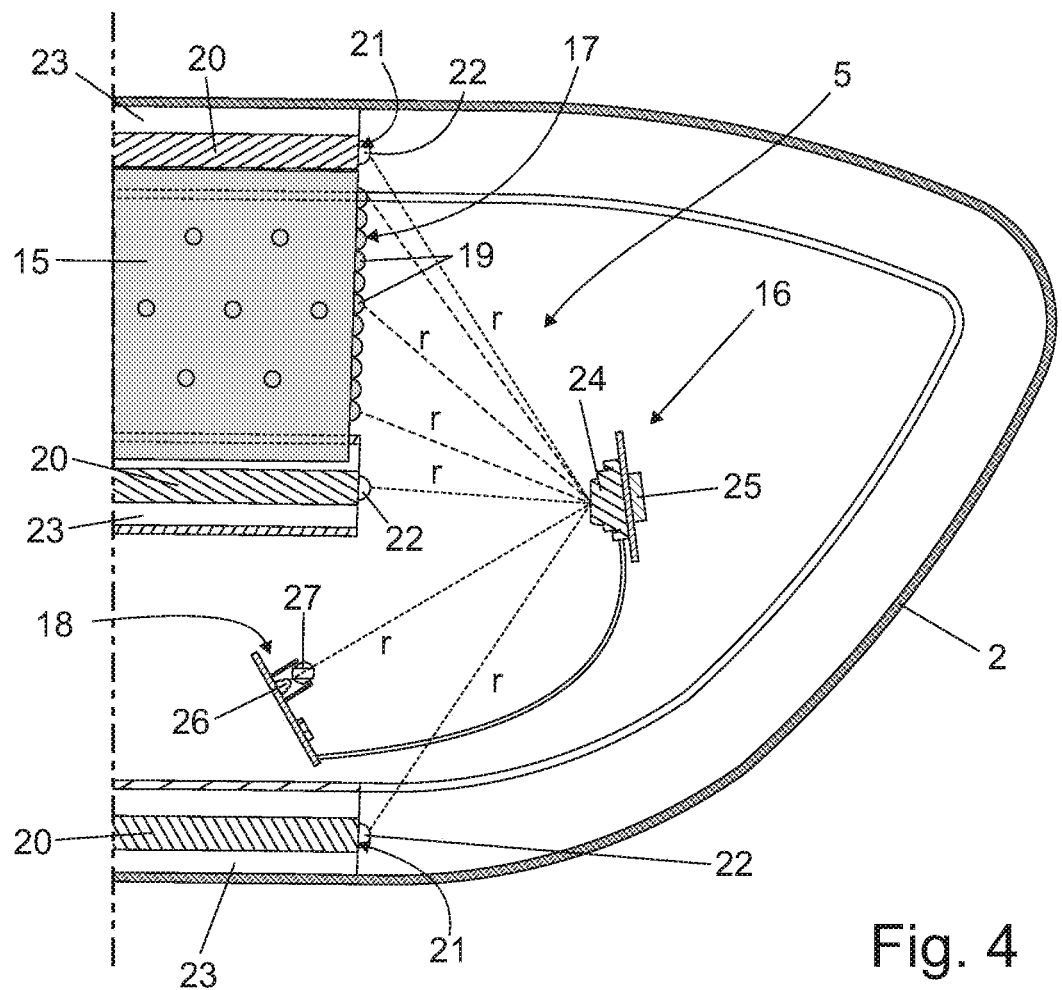
FIG. 4 is a sectional view of a portion of the automotive lighting unit shown in the preceding figures, with parts removed for greater clarity.
Figure 5:
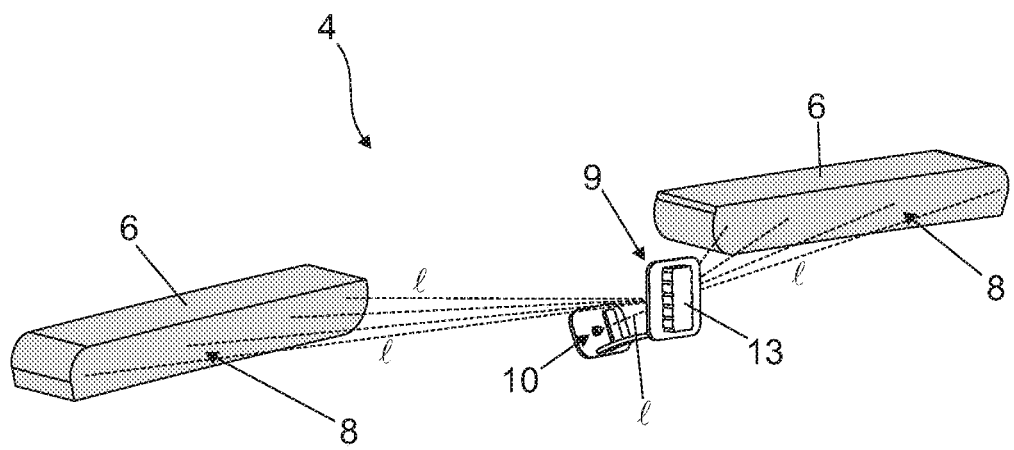

With reference to FIGS. 1, 2 and 3, the automotive lighting unit 1 firstly comprises: a rigid and preferably made of plastic material, rear body 2 which is substantially basin-shaped, and is preferably structured to be at least partially recessed into a seat especially formed in the rear part of the bodywork of the vehicle (not shown); a rigid and preferably made of plastic material, front half-shell 3 which is placed in front of the mouth of the rear body 2, preferably so as to close the mouth of the rear body 2 and preferably so as to simultaneously surface outwards of the bodywork of the vehicle; and at least one electrically-powered lighting assembly which emits light on command, is placed inside the rear body 2, and is adapted to backlight a corresponding transparent or semi-transparent portion of front half-shell 3.

In the example shown, in particular, the automotive lighting unit 1 is preferably provided with at least two electrically-powered lighting assemblies 4 and 5, each of which emits light on command and is placed inside the rear body 2 in a position that allows to backlight a corresponding transparent or semi-transparent portion of front half-shell 3, preferably separately from and independently of any other lighting assembly of the lighting unit.

In addition, in the example shown, the rear body 2 is preferably made of an opaque plastic material, preferably via an injection moulding process. The front half-shell 3, on the other hand, is preferably made of a transparent or semi-transparent plastic material, such as for example polycarbonate or polymethyl methacrylate, again preferably via an injection moulding process.

Obviously, in a different embodiment, the rear body 2 could be designed so as to be simply fixed in cantilever manner to the rear part of the bodywork of the vehicle (not shown).

With reference to FIGS. 1, 2, 3 and 5, the lighting assembly 4 in turn comprises: at least one and preferably a plurality of oblong and preferably also straight, light-guide section bars 6, each of which is made of a photoconductive material and is placed inside the rear body 2 with its front end 7 facing and/or substantially skimmed over a corresponding transparent or semi-transparent portion of front half-shell 3, and with its rear end 8 facing the bottom of rear body 2; an electronically-controlled active light deflector device 9 which is placed inside the rear body 2, preferably close to the bottom of the rear body 2, so as to face the rear end 8 of the or of each light-guide section bar 6; and an electrically-powered LASER light emitting device 10 which is placed inside the rear body 2, preferably close to the bottom of the rear body 2, and is capable of emitting and directing a laser beam l (i.e. a beam of coherent and monochromatic light, which is extremely concentrated and collimated) directly towards/against the active light deflector device 9 which, in turn, is adapted to receive/deflect the laser beam l towards the rear end 8 of the or of each light-guide section bar 6.

More in detail, the active light deflector device 9 is adapted to reflect/deflect the laser beam l towards the rear end 8 of the or of each light-guide section bar 6, so that said laser beam l can enter into the light-guide section bar 6 and then freely travel inside the light-guide section 6 by total internal reflection. After having reached the front end 7 of the section bar, the laser light travelling inside the light-guide section bar 6 freely comes out from the front end 7 of the light-guide section bar 6, directed towards the front half-shell 3.

In other words, the light-guide section bar 6 is structured so as to channel, by total internal reflection, the light entering into the light-guide section bar 6 from the rear end 8 up to the front end 7, from where the light comes out of the section bar.

In addition, the active light deflector device 9 is additionally structured so as to move the light beam l in a swinging manner along at least a part/sector of the rear end 8 of the aforesaid light-guide section bar 6, with a given speed greater than the one perceivable by the human eye (for example with a scanning speed exceeding 50 hz), so as to simulate/let the external observer perceive a substantially uniform lighting of said part/sector of the rear end 8.

With reference to FIGS. 1, 2, 3 and 5, in the example shown, in particular, the light-guide section bar or bars 6 extend inside the concave rear body 2, preferably while remaining locally substantially perpendicular to the front half-shell 3.

Preferably, the light-guide section bar or bars 6 moreover have an oblong rectangular-shaped cross section.

In order words, the or each light-guide section bar 6 preferably has a plate-like structure, preferably with the front end 7 and rear end 8 with a flat and oblong shape. In addition, the front end 7 of light-guide section bar 6 is preferably arranged locally substantially skimmed over and, optionally, also substantially parallel to the corresponding transparent or semi-transparent portion of front half-shell 3.

The active light deflector device 9, in turn, is preferably adapted to move the laser beam l is swinging manner substantially along the entire length/extension of the rear end 8 of light-guide section bar 6, so as to simulate/let an external observer perceive a substantially uniform lighting of the entire rear end 8 of the section bar.

Obviously, a substantially uniform lighting of the entire rear end 8 the light-guide section bar 6 causes/produces a substantially uniform lighting of the entire front end 7 of light-guide section bar 6 and, hence, also of the facing transparent or semi-transparent portion of front half-shell 3.

Preferably, the lighting assembly 4 is moreover provided with a screening element 11 which is placed inside the rear body 2, immediately underneath the front half-shell 3, and is adapted to hide/conceal the active light deflector device 9, the LASER light emitting device 10 and, preferably, also the rear part of the or of each light-guide section bar 6.

With reference to FIGS. 1, 2, 3 and 5, in the example shown, in particular, the lighting assembly 4 is preferably provided with two substantially plate-like light-guide section bars 6 which extend inside the rear body 2 one spaced beside the other, preferably while remaining locally substantially perpendicular to the front half-shell 3, and which are preferably also substantially coplanar to one another.

Each light-guide section bar 6, in addition, is preferably made of Plexiglas, transparent polycarbonate or another similar transparent plastic material, preferably via an injection moulding process.

The screening element 11, on the other hand, preferably has a substantially plate-like structure and extends inside the rear body 2, preferably while remaining locally substantially skimmed over and, optionally, also substantially parallel to a part of front half-shell 3.

In addition, the light-guide section bar or bars 6 preferably extend in passing-through manner through the plate-like screening element 11.

More in detail, in the example shown, the screening element 11 preferably consists of an opaque plate-like body, preferably with a narrow and oblong shape, i.e. ribbon-like, which is made of plastic material and is placed inside the rear body 2 locally substantially skimmed over a part of front half-shell 3.

The two light-guide section bars 6, in turn, are inserted in passing-through manner in the screening element 11, so that the front end 7 of each light-guide section bar 6 can surface or protrude from the front face of screening element 11, in order to direct the out-coming light directly towards the front half-shell 3.

On the other hand, the active light deflector device 9 comprises a MOEMS device 12 (acronym for Micro Opto-Electro-Mechanical System), and a control electronics 13 adapted to control the MOEMS device 12 and, optionally, also the LASER light emitting device 10.

More in detail, the control electronics 13 is adapted to control the MOEMS device 12 so as to deflect the laser beam l coming from the LASER light emitting device 10 towards the rear end 8 of light-guide section bar 6 or of any one of the light-guide section bars 6, and then to move the laser beam l in swinging manner and at a high speed along the rear end 8 of the same light-guide section bar 6.

Preferably, the MOEMS device 12 furthermore is a DMD device (acronym for Digital Micromirror Device), i.e. a miniaturized integrated circuit with thousands of orientable micromirrors, or a micromirror scanner with an electronically controlled integrated moving system.

DMD devices and micromirror scanners with integrated electronically-controlled moving system can easily be found in the market and, therefore, will not be further described.

The LASER emitting device 10, on the other hand, preferably is a known RGB LASER emitter.

With reference to FIGS. 1, 2, 3, 4 and 6, on the other hand, the lighting assembly 5 preferably comprises: and least one light-guide plate 15, which is made of a photoconductive material and extends inside the body 2 with its front face locally substantially skimmed over and, optionally, also parallel to a corresponding transparent or semi-transparent portion of front half-shell 3, preferably substantially for the entire extension of the same transparent or semi-transparent portion; a second electronically controlled active light deflector device 16, which is placed inside the rear body 2, preferably close to a lateral wall of rear body 2, so as to face a lateral sidewall 17 of light-guide plate 15; and an electrically-powered LED light emitting device 18, which is placed inside the rear body 2, preferably close to a lateral wall of rear body 2, and is capable of emitting and directing a collimated light beam r (i.e. a group of light rays collimated in the same direction) directly towards/against the active light deflector device 16 which, in turn, is adapted to reflect/deflect the collimated light beam r towards the lateral sidewall 17 of light-guide plate 15.

More in detail, the active light deflector device 16 is adapted to reflect/deflect the collimated light beam r towards the lateral sidewall 17 of light-guide plate 15, so that said collimated light beam r can enter into the light-guide plate 15 and then freely travel inside the light-guide plate 15 by total internal reflection.

The light-guide plate 15, in turn, is structured so as to allow the light travelling inside the light-guide plate 15 to progressively come out from its front face, so as to backlight the facing transparent or semi-transparent portion of front half-shell 3.

In other words, the light-guide plate 15 is structured to channel, by total internal reflection, the light entering the light-guide plate 15 from the lateral sidewall 17 up to the front face of the plate, from where the light comes out of light-guide plate 15.

In addition, the active light deflector device 16 is additionally structured to move the collimated light beam r in a swinging manner along at least a portion/segment of the lateral sidewall 17 of light-guide plate 15, with a given speed which is greater than the one perceivable by the human eye (for example with a scanning speed exceeding 50 hz), so as to simulate/let the external observer perceive a substantially uniform lighting of said portion/segment of lateral sidewall 17.

More in detail, the active light deflector device 16 is preferably adapted to move the collimated light beam r in a swinging manner substantially along the entire length/extension of the lateral sidewall 17 of light-guide plate 15, so as to have the external observer perceive a substantially uniform lighting of the entire lateral sidewall 17.

Obviously, a substantially uniform lighting of the entire sidewall 17 of light-guide plate 15 causes/produces a substantially uniform lighting of the front face of light-guide plate 15 and, hence, also of the superjacent transparent or semi-transparent portion of front half-shell 3.

In the example shown, in particular, the light-guide plate 15 is preferably narrow and oblong in shape, i.e. substantially ribbon-like, and preferably extends inside the rear body 2 adjacent and substantially coplanar to the screening element 11 of lighting assembly 5.

The lateral sidewall 17 of light-guide plate 15 is furthermore provided with a series of divergent optics 19 which are shaped so as to spread and diffuse, inside the body of light-guide plate 15, the collimated light beam r reaching the lateral sidewall 17.

On the other hand, the rear face of light-guide plate 15 is preferably provided with a multitude of recesses or grooves with microscopical dimensions, which are properly distributed on surface of the same face and are shaped so as to deflect, towards the front face of light-guide plate 15, the light rays travelling inside the light-guide plate and reaching said recesses or grooves, with an angle of incidence that allows the light to come out of the light-guide plate 15 and travel towards the front half-shell 3.

As an alternative to the light extraction and scattering means mentioned above, the controlled exit of light from the front face of light-guide plate 15 can be obtained by subjecting the surface of the plate to a surface abrasion process (sandblasting), to a silking process or to a screen printing process, so as to locally increase the roughness of the surface of the light-guide plate 15.

Finally, the light-guide plate 15 is preferably made of Plexiglas, transparent polycarbonate or other similar transparent plastic material, preferably via an injection moulding process.

With reference to FIGS. 1, 2, 3, 4 and 6, preferably the lighting assembly 5 additionally also comprises one or more light-guide rods 20 that are made of a photoconductive material and extend inside the body 2 while remaining, at least for a segment thereof, locally substantially skimmed over and, optionally, also parallel to corresponding transparent or semi-transparent portions of front half-shell 3.

The active light deflector device 16, in addition, is preferably adapted to reflect/deflect the collimated light beam r arriving from the LED light emitting device 18 also towards an end 21 of the or of each light-guide rod 20, so that said collimated light beam r can enter into the light-guide rod 20 and then freely travel inside the light-guide rod 20 by total internal reflection.

The or each light-guide rod 20, in turn, is structured to allow the light travelling inside the light-guide rod 20 to come out of the lateral sidewall of the bar that is locally skimmed over to/faces the front half-shell 3, so as to backlight the facing transparent or semi-transparent portion of front half-shell 3.

In other words, the or each light-guide rod 20 is structured to channel, by total internal reflection, the light entering the light-guide rod 20 from the end 21 of the rod up to the portion of the lateral sidewall skimmed over the transparent or semi-transparent portion of front half-shell 3 to be backlighted, from where the light comes out of light-guide rod 20.

In the example shown, in particular, the or each light-guide rod 20 preferably has a substantially circular- or elliptical-shaped cross section, and it is moreover provided with a substantially flat longitudinal band that extends along the lateral side of light-guide bar 20 opposite to the portion of front half-shell 3 to be backlighted, more or less parallel to the longitudinal axis of the light-guide rod 20.

The light-guide rod 20 moreover has, along the flat longitudinal band, a sequence of small, preferably substantially triangular in shape, transverse deflector ribs (not visible in the figures) that protrude from the flat longitudinal band and extend substantially perpendicular to the centreline of the flat longitudinal band, preferably along the entire width of the flat longitudinal band. The deflector ribs are shaped so as to deflect, towards the opposite side of the light-guide rod 20 (and, hence, towards the front half-shell 3), the light rays travelling inside the light-guide rod 20 and entering into the same deflector ribs, with an angle of incidence allowing the light to come out of the light-guide rod 20 and travel towards the adjacent front half-shell 3.

Preferably, the or each light-guide rod 20 is finally made of Plexiglas, transparent polycarbonate or other similar transparent plastic material, preferably via an injection moulding process.

With reference to FIGS. 1, 2, 3, 4 and 6, in the example shown, in particular, the lighting assembly 5 is preferably provided with three substantially straight, light-guide rods 20 that extend inside the rear body 2 remaining substantially parallel to one another and/or to the front half-shell 3. Furthermore, two out of these three light-guide rods 20 extend adjacent and locally substantially parallel to the two larger sides of the light-guide plate 15.

Preferably, the lighting assembly 5 additionally comprises, for one or each light-guide rod 20, a respective auxiliary diffusion lens and/or a respective lateral lens body 22.

The auxiliary diffusion lens 22 is placed at the end of the light-incoupling end 21 of light-guide rod 20 and has a divergent profile so as to spread and diffuse, inside the body of light-guide rod 20, the collimated light beam r that reaches the end 21 of light-guide rod 20 and enters into the light-guide rod 20.

The lateral lens body 23, on the other hand, extends skimmed over the light-guide rod 20, between the light-guide rod 20 and the front half-shell 3, and is made of a transparent or semi-transparent, optionally even coloured, material, so as to be crossed by the light coming out of the light-guide rod 20, directed towards the front half-shell 3.

Preferably, the lateral lens body 23 is furthermore structured so as to diffuse, preferably in substantially Lambertian manner, the light coming out of light-guide rod and directed towards the front half-shell 3.

Similarly to the light-guide rod/s 20, the lateral lens bodies 23 are preferably made of a transparent or semi-transparent plastic material, preferably via an injection moulding process.

Similarly to the active light deflector device 9, the light deflector device 16 comprises a MOEMS device 24 (acronym for Micro Opto-Electro-Mechanical System), and a control electronics 25 adapted to control the MOEMS device 24 and, optionally, also the LED light emitting device 18.

More in detail, the control electronics 25 is adapted to control the MOEMS device 24 so as to deflect the collimated light beam r arriving from the LED light emitting device 18 towards the lateral sidewall 17 of light-guide plate 15, and then to move the collimated light beam r in a swinging manner and at a high speed along the lateral sidewall 17 of the same light-guide plate 15.

In addition, the control electronics 25 is moreover adapted to control the MOEMS device 24 so as to deflect the collimated light beam r coming from the LED light emitting device 18 towards the end of the or of each light-guide rod 20, and—optionally—also to move the collimated light beam r in a swinging manner and at a high speed along the end of the light-guide rod 20.

Preferably, the MOEMS device 24 furthermore is a DMD device (acronym for Digital Micromirror Device), i.e. a miniaturized integrated circuit with thousands of orientable micromirrors, or a micromirror scanner with an electronically-controlled integrated moving system.

DMD devices and micromirror scanners with electronically controlled integrated moving system can easily be found in the market and, therefore, will not be further described.

The LED light emitting device 18, on the other hand, preferably comprises: a high-power LED 26 (acronym for Light Emitting Diode) of known type; and a collimating optic assembly 27 of known type, which is placed in front of the LED 26 and is structured to concentrate and collimate in a same direction the light rays coming out of the same LED 26, so as to form the collimated light beam r.

Operation of automotive lighting unit 1 is easily inferable from the description above and does not require further explanations.

As regards on the other hand the lighting assemblies 4 and 5, the active light deflector devices 9 and 16 direct and distribute, on command, the light emitted by the LASER light emitting device 10 or by the LED light emitting device 18 in a selective manner towards the light-incoupling end or sidewall of the corresponding oblong light-guide body/bodies (i.e. the light-guide section bar/s 6, the light-guide plate 15 and the light-guide rod/s 20), so that the light can enter into the guide-light body and then freely travel inside the light-guide body by total internal reflection. Said light than comes out, in a controlled manner, from a second end, face or lateral sidewall of the light-guide body 6, 15, 20 so as to backlight the front half-shell 3.

In other words, the high moving speed of the laser beam l or of the collimated light beam r provided by the active light deflector device 9, 16 allows to affect the light-incoupling ends or sidewalls of a part of or of all the oblong light-guide bodies of a same lighting assembly (i.e. the light-guide section bar/s 6, the light-guide plate 15 and the light-guide rod/s 20), so as to introduce into them light preferably with different colours, in order that the automotive lighting unit 1 can simultaneously emit different light signals, i.e. light signals associated with different functions (for instance the position of the vehicle, the sudden deceleration of the vehicle and/or the turning direction of the vehicle, etcetera).

The advantages associated to the presence of the dynamic light deflector devices 9 and 16 are remarkable.

The presence of the dynamic light deflector devices 9 and 16 allows to significantly reduce the number of light sources needed to properly backlight the front half-shell 3, with all the advantages arising therefrom.

Theoretically speaking, it is possible to use one single LASER 10 or LED 18 light emitting device to backlight, in a selective and independent manner, a large umber of transparent or semi-transparent portions of the half-shell 3, each associated with a specific different light signal of the lighting unit.

The special structure of lighting assemblies 4 and 5 therefore allows to reduce the lighting unit manufacturing costs and to eliminate the heat dissipation problems associated with the use of a large number of LEDs. In addition, the special structure of the lighting assemblies 4 and 5 allows to also significantly reduce the overall dimensions of the automotive lighting unit 1.

It is finally clear that the automotive lighting unit 1 described above may be subjected to changes and variations without however going beyond the scope of protection of the present invention.

For example, instead of being placed on the rear face of light-guide plate 15, the light extraction and scattering means can be placed on the front face of the light-guide plate 15 with an identical result.

Furthermore, according to a different embodiment, the lighting assembly 5 can have no light-guide plate 15. In this case, the active light deflector device 16 is adapted to direct the light produced by the LED light emitting device 18 towards the light-incoupling end of the light-guide rod/s 20.

The invention claimed is:

1. An automotive lighting unit, comprising:
   a substantially basin-shaped, rear body;
   a front half-shell placed in front of the mouth of the rear body; and
   at least one lighting assembly that emits light on command, and is located inside the rear body so as to be able to backlight a corresponding transparent or semi-transparent portion of the front half-shell;
   wherein the lighting assembly comprises:
      a plurality of light-guide bodies made of photoconductive material, each of the plurality of light-guide bodies is placed inside the rear body and is structured to channel, by total internal reflection and towards a corresponding transparent or semi-transparent portion of the front half-shell, the light that enters in the respective plurality of light-guide bodies through a light-incoupling end of the respective plurality of light-guide bodies;
      an active light deflector device which is placed inside the rear body, facing the light-incoupling end of the plurality of light-guide bodies; and
      an electrically-powered light source which is placed inside the rear body and emits, on command, a collimated light beam towards the active light deflector device; and
   wherein the active light deflector device is adapted to reflect/divert said collimated light beam directly upon the light-incoupling ends of the plurality of light-guide bodies in a scanning manner so that the collimated light beam can enter into the plurality of light-guide bodies and then travel inside the plurality of light-guide bodies by total internal reflection.

2. The automotive lighting unit according to claim 1, wherein the active light deflector device is adapted to move the collimated light beam in a swinging manner along at least a part of the light-incoupling end or sidewall of at least one of the plurality of light-guide bodies, with a speed greater than that perceptible by the human eye.

3. The automotive lighting unit according to claim 2, wherein the active light deflector device is adapted to move the collimated light beam in a swinging manner along substantially the entire light-incoupling end or sidewall of at least one of the plurality of light-guide bodies, with a speed greater than that perceptible by the human eye.

4. The automotive lighting unit according to claim 1, wherein the active light deflector device comprises: a MOEMS device, and a control electronics adapted to drive said MOEMS device.

5. The automotive lighting unit according to claim 4, wherein said control electronics is additionally adapted to drive said light source.

6. The automotive lighting unit according to claim 4, wherein said MOEMS device is a digital micromirror device, or a micromirror scanner with an electronically-controlled integrated moving system.

7. The automotive lighting unit according to claim 1, wherein said light source is a LASER light emitting device or a LED light emitting device with a collimating optic assembly.

8. The automotive lighting unit according to claim 1, wherein at least one of the plurality of light-guide bodies comprises an oblong light-guide section-bar which is placed inside the rear body with its front end facing and/or substantially skimming the front half-shell, and with its rear end facing the bottom of the rear body; the light-guide section-bar being structured to channel, by total internal reflection up to the front end of the oblong light-guide section-bar, the light that enters in the at least one of the plurality of light-guide bodies from the rear end of the section-bar.

9. The automotive lighting unit according to claim 1, wherein at least one of the plurality of light-guide bodies comprises a light-guide plate, which extends inside the rear body with its front face substantially locally skimming the front half-shell; the light-guide plate being structured to channel, by total internal reflection up to the front face of the at least one of the plurality of light-guide bodies, the light that enters in the light-guide plate from a lateral sidewall of the same plate.

10. The automotive lighting unit according to claim 9, wherein said lateral sidewall of the light-guide plate is provided with a series of divergent optics which are shaped so as to spread and diffuse, inside the body of the light-guide plate, the collimated light beam that enters into the light-guide plate.

11. The automotive lighting unit according to claim 1, wherein at least one of the plurality of light-guide bodies a light-guide rod, which extends inside the rear body while remaining, for at least one section, locally substantially skimmed over the front half-shell; the light-guide rod being structured so as to channel, by total internal reflection, the light that enters in the light-guide rod from a first end of the same light-guide rod, towards the portion of the lateral side that is substantially skimmed over the front half-shell.

12. The automotive lighting unit according to claim 11, wherein on the first end of said light-guide rod, there is an auxiliary diffusion lens having a divergent profile so as to spread and diffuse, inside the body of the light-guide rod, the collimated light beam that enters into the light-guide rod.

13. The automotive lighting unit according to claim 1, wherein at least one of the plurality of light-guide bodies is made of transparent plastic material, preferably via an injection molding process.

* * * * *